(12) United States Patent
Ariizumi et al.

(10) Patent No.: US 6,728,504 B2
(45) Date of Patent: Apr. 27, 2004

(54) DEVELOPING DEVICE USING A MAGNET BRUSH AND IMAGE FORMING APPARATUS INCLUDING THE SAME

(75) Inventors: Osamu Ariizumi, Kanagawa (JP); Takeyoshi Sekine, Tokyo (JP); Nobuo Takami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/944,076

(22) Filed: Sep. 4, 2001

(65) Prior Publication Data

US 2002/0028092 A1 Mar. 7, 2002

(30) Foreign Application Priority Data

Sep. 7, 2000 (JP) .......................... 2000-271424

(51) Int. Cl.$^7$ .............................................. G03G 15/09
(52) U.S. Cl. ........................................ 399/267; 399/275
(58) Field of Search ........................... 399/267, 272, 399/277, 275; 430/122

(56) References Cited

U.S. PATENT DOCUMENTS

| | | | |
|---|---|---|---|
| 5,109,254 A | 4/1992 | Oka et al. | |
| 5,173,388 A | * 12/1992 | Uezono et al. | 430/122 |
| 5,220,383 A | 6/1993 | Enoki et al. | |
| 5,227,842 A | 7/1993 | Hayashi et al. | |
| 5,239,344 A | 8/1993 | Enoki et al. | |
| 5,245,391 A | 9/1993 | Suzuki et al. | |
| 5,270,783 A | 12/1993 | Bisaiji et al. | |
| 5,311,263 A | 5/1994 | Suzuki et al. | |
| 5,327,199 A | 7/1994 | Sekine | |
| 5,339,141 A | 8/1994 | Suzuki et al. | |
| 5,384,628 A | 1/1995 | Takami et al. | |
| 5,389,733 A | 2/1995 | Enoki et al. | |
| 5,416,568 A | 5/1995 | Yoshiki et al. | |
| 5,424,814 A | 6/1995 | Suzuki et al. | |
| 5,442,425 A | * 8/1995 | Yokoyama et al. | 399/276 |
| 5,450,177 A | 9/1995 | Oyama | |
| 5,508,794 A | 4/1996 | Ikesue et al. | |
| 5,565,973 A | 10/1996 | Fujishiro et al. | |
| 5,571,987 A | * 11/1996 | Goto et al. | 399/276 |
| 5,598,254 A | 1/1997 | Ikesue et al. | |
| 5,627,630 A | 5/1997 | Matsumae et al. | |
| 5,655,193 A | 8/1997 | Fujishiro et al. | |
| 5,659,860 A | 8/1997 | Sasaki et al. | |

(List continued on next page.)

FOREIGN PATENT DOCUMENTS

| | | | | |
|---|---|---|---|---|
| JP | 63208867 A | * | 8/1988 | G03G/13/09 |
| JP | 02120763 A | * | 5/1990 | G03G/15/01 |
| JP | 6-222673 | | 8/1994 | |

OTHER PUBLICATIONS

U.S. patent application Ser. No. 10/083,159, filed Feb. 27, 2002, pending.

(List continued on next page.)

*Primary Examiner*—Robert Beatty
(74) *Attorney, Agent, or Firm*—Oblon, Spivak, McClelland, Maier & Neustadt, P.C.

(57) ABSTRACT

A developing device of the present invention includes an image carrier for forming a latent image thereon, and a developer carrier for depositing a developer thereon in the form of a magnet brush. The magnet brush is caused to contact the latent image to thereby develop it. The developer carrier includes a main magnetic pole for development and an auxiliary magnetic pole adjoining the main pole and helping the main pole exert a magnetic force. The developer carrier and said image carrier are spaced by a gap of 0.35 mm or above, but 0.5 mm or below. The developer carrier has a carrier packing ratio of 15% or above, but 45% or below, measured at the developing region.

6 Claims, 17 Drawing Sheets

U.S. PATENT DOCUMENTS

| | | | |
|---|---|---|---|
| 5,671,470 A | | 9/1997 | Maruta et al. |
| 5,724,634 A | | 3/1998 | Maruta |
| 5,771,426 A | | 6/1998 | Oka et al. |
| 5,774,772 A | | 6/1998 | Kai et al. |
| 5,790,929 A | * | 8/1998 | Goto et al. .................. 399/260 |
| 5,805,965 A | | 9/1998 | Tsuda et al. |
| 5,819,145 A | | 10/1998 | Tanaka et al. |
| 5,822,664 A | | 10/1998 | Oka et al. |
| 5,826,146 A | | 10/1998 | Maruata et al. |
| 5,835,825 A | | 11/1998 | Maruta |
| 5,860,038 A | | 1/1999 | Kato et al. |
| 5,864,733 A | | 1/1999 | Mae et al. |
| 5,881,334 A | | 3/1999 | Maruta et al. |
| 5,915,155 A | | 6/1999 | Shoji et al. |
| 6,009,293 A | | 12/1999 | Takami |
| 6,055,386 A | | 4/2000 | Kato et al. |
| 6,081,678 A | | 6/2000 | Kato |
| 6,081,684 A | | 6/2000 | Naganuma et al. |
| 6,122,469 A | | 9/2000 | Miura et al. |
| 6,125,243 A | | 9/2000 | Shoji et al. |
| 6,160,569 A | | 12/2000 | Fujimori et al. |
| 6,160,979 A | | 12/2000 | Shoji |
| 6,163,669 A | | 12/2000 | Aoki et al. |
| 6,226,481 B1 | | 5/2001 | Yoneda et al. |
| 6,335,137 B1 | | 1/2002 | Suzuki et al. |
| 6,337,957 B1 | | 1/2002 | Tamaki et al. |
| 6,403,275 B1 | | 6/2002 | Kuramoto et al. |
| 6,442,364 B2 | | 8/2002 | Kai et al. |
| 6,468,706 B2 | | 10/2002 | Matsuda et al. |
| 6,505,014 B2 | | 1/2003 | Aoki et al. |
| 6,507,718 B2 | | 1/2003 | Ohjimi et al. |

OTHER PUBLICATIONS

U.S. patent application Ser. No. 09/944,076, filed Sep. 4, 2001, pending.

U.S. patent application Ser. No. 10/303,910, filed Nov. 26, 2002, pending.

U.S. patent application Ser. No. 09/802,953, Sugihara, filed Mar. 12, 2001.

U.S. patent application Ser. No. 09/976,159, Hatori et al., filed Oct. 15, 2001.

U.S. patent application Ser. No. 09/985,000, Maruta et al., filed Jan. 11, 2001.

U.S. patent application Ser. No. 10/114,265, Maruta et al., filed Apr. 3, 2002.

U.S. patent application Ser. No. 10/212,714, Sugihara, filed Aug. 7, 2002.

U.S. patent application Ser. No. 10/322,600, Enoki et al., Dec. 19, 2002.

U.S. patent application Ser. No. 09/556,968, filed Apr. 24, 2000, pending.

U.S. patent application Ser. No. 09/662,550, filed Sep. 15, 2000, pending.

U.S. patent application Ser. No. 09/814,726, filed Mar. 23, 2001, pending.

U.S. patent application Ser. No. 10/050,955, filed Jan. 22, 2002, pending.

U.S. patent application Ser. No. 09/998,316, filed Dec. 3, 2001, pending.

U.S. patent application Ser. No. 09/656,414, filed Sep. 6, 2000, unknown.

U.S. patent application Ser. No. 09/565,539, filed Mar. 5, 2000, allowed.

U.S. patent application Ser. No. 09/567,982, filed May 10, 2000, allowed.

U.S. patent application Ser. No. 09/820,609, filed Mar. 30, 2001, pending.

U.S. patent application Ser. No. 09/873,246, filed Jun. 5, 2001, pending.

U.S. patent application Ser. No. 09/905,872, filed Jul. 17, 2001, pending.

U.S. patent application Ser. No. 09/943,505, filed Aug. 31, 2001, pending.

U.S. patent application Ser. No. 09/965,826, filed Oct. 1, 2001, pending.

U.S. patent application Ser. NO. 09/953,922, filed Sep. 18, 2001, allowed.

U.S. patent application Ser. No. 09/982,877, filed Oct. 22, 2001, pending.

U.S. patent application Ser. No. 09/963,429, filed Sep. 27, 2001, allowed.

U.S. patent application Ser. No. 09/996,585, filed Nov. 30, 2001, pending.

U.S. patent application Ser. No. 10/077,813, filed Feb. 20, 2002, pending.

U.S. patent application Ser. No. 10/077,752, filed Feb. 20, 2002, pending.

U.S. patent application Ser. No. 10/086,683, filed Mar. 4, 2002, pending.

U.S. patent application Ser. No. 10/098,591, filed Mar. 18, 2002, pending.

U.S. patent application Ser. No. 10/151,103, filed May 21, 2002, pending.

U.S. patent application Ser. No. 10/155,111, filed May 28, 2002, pending.

U.S. patent application Ser. No. 10/285,636, filed Nov. 1, 2002, pending.

* cited by examiner

Fig. 21

EXAMPLE 1
| POLE | P1 | P2 | P3 | P4 | P5 | P6 |
|---|---|---|---|---|---|---|
| POLARITY | N | S | S | S | N | S |
| PEAK FLUX DENSITY (mT) | 130 | 65 | 7 | 20 | 72 | 75 |
| CENTER HALF ANGLE (°) | 0 | 60 | 115 | 157 | 207 | 291 |
| CENTER HALF-POWER ANGLE | 18 | 40 | – | 35 | 34 | 29 |

EXAMPLE 2
| POLE | P1 | P2 | P3 | P4 | P5 | P6 |
|---|---|---|---|---|---|---|
| POLARITY | N | S | S | S | N | S |
| PEAK FLUX DENSITY (mT) | 110 | 60 | 4 | 30 | 79 | 82 |
| CENTER HALF ANGLE (°) | 0 | 62 | 118 | 158 | 224 | 285 |
| CENTER HALF-POWER ANGLE | 20 | 30 | – | 30 | 47 | 41 |

EXAMPLE 3
| POLE | P1 | P2 | P3 | P4 | P5 | P6 |
|---|---|---|---|---|---|---|
| POLARITY | N | S | S | S | N | S |
| PEAK FLUX DENSITY (mT) | 94 | 73 | 5 | 52 | 65 | 58 |
| CENTER HALF ANGLE (°) | 0 | 65 | 120 | 154 | 217 | 291 |
| CENTER HALF-POWER ANGLE | 30 | 46 | – | 35 | 55 | 40 |

EXAMPLE 4
| POLE | P1 | P2 | P3 | P4 | P5 | P6 |
|---|---|---|---|---|---|---|
| POLARITY | N | S | S | S | N | S |
| PEAK FLUX DENSITY (mT) | 95 | 90 | 50 | 5 | 60 | 55 |
| CENTER HALF ANGLE (°) | 0 | 62 | 117 | 160 | 223 | 289 |
| CENTER HALF-POWER ANGLE | 37 | 47 | 42 | – | 45 | 59 |

EXAMPLE 5
| POLE | P1 | P2 | P3 | P4 |
|---|---|---|---|---|
| POLARITY | N | S | N | S |
| PEAK FLUX DENSITY (mT) | 94 | 73 | 10 | 80 |
| CENTER HALF ANGLE (°) | 0 | 65 | – | 290 |
| CENTER HALF-POWER ANGLE | 25 | 46 | – | 55 |

COMPARATIVE EXAMPLE 1
| POLE | P1 | P2 | P3 | P4 | P5 | P6 |
|---|---|---|---|---|---|---|
| POLARITY | N | S | S | S | N | S |
| PEAK FLUX DENSITY (mT) | 95 | 90 | 50 | 5 | 60 | 55 |
| CENTER HALF ANGLE (°) | 0 | 62 | 117 | 160 | 223 | 289 |
| CENTER HALF-POWER ANGLE | 46 | 47 | 35 | – | 37 | 55 |

COMPARATIVE EXAMPLE 2
| POLE | P1 | P2 | P3 | P4 | P5 | P6 |
|---|---|---|---|---|---|---|
| POLARITY | N | S | S | S | N | S |
| PEAK FLUX DENSITY (mT) | 94 | 73 | 5 | 52 | 65 | 58 |
| CENTER HALF ANGLE (°) | 0 | 62 | 105 | 148 | 217 | 291 |
| CENTER HALF-POWER ANGLE | 45 | 46 | – | 35 | 55 | 40 |

COMPARATIVE EXAMPLE 3
| POLE | P1 | P2 | P3 | P4 | P5 | P6 |
|---|---|---|---|---|---|---|
| POLARITY | N | S | S | S | N | S |
| PEAK FLUX DENSITY (mT) | 95 | 65 | 5 | 27 | 68 | 75 |
| CENTER HALF ANGLE (°) | 0 | 63 | 110 | 154 | 206 | 289 |
| CENTER HALF-POWER ANGLE | 50 | 37 | – | 30 | 40 | 52 |

DEVELOPING DEVICE USING A MAGNET BRUSH AND IMAGE FORMING APPARATUS INCLUDING THE SAME

BACKGROUND OF THE INVENTION

1. Field of the Art

The present invention relates to a developing device using a magnet brush and an image forming apparatus including the same.

2. Description of the Background Art

A developing system using a magnet brush is extensively applied to a photographic image forming apparatus of the type using a two-ingredient type developer, i.e., a toner and carrier mixture. In the magnet brush type developing system, a developer carrier conveys a developer deposited thereon in the form of a magnet brush and causes it to contact an image carrier, which carries a latent image thereon. An electric field is formed between the image carrier and a sleeve to which an electric bias is applied. The electric field causes the toner of the developer to selectively deposit on the latent image for thereby developing the latent image.

The developer carrier has a magnet roller accommodated in the sleeve, which is usually cylindrical. The magnet roller causes the developer deposited on the sleeve to rise in the form a magnet brush. The toner, which is charged to preselected polarity, deposits on the carrier present in the magnet brush. The magnet roller has a plurality of magnetic poles each being formed by a particular rod-like or similar magnet. Among the poles, a main pole is positioned on the surface of the sleeve in a developing region for causing the developer to rise. At least one of the sleeve and magnet roller moves relative to the other so as to cause the developer forming the magnet brush on the sleeve to move.

The developer brought to the developing region rises in the form of chains along magnetic lines of force issuing from the main pole of the magnet roller. The chains contact the surface of the image carrier while yielding. The chains feed the toner to the latent image while rubbing themselves against the latent image on the basis of a difference in linear velocity between the developer carrier and the image carrier. The developing region refers to a range over which the magnet brush on the developer carrier contacts the image carrier.

A problem with the conventional developing system of the type described is that a brush mark appears in an image if the amount of the developer deposited on the sleeve is short. Conversely, the developer adheres to the sleeve or varies a load acting on the image carrier if excessive in amount.

The distance between the image carrier and the sleeve, i.e., a development gap contributes a great deal to image quality. The gap enhances the edge effect and thereby lowers image quality if excessive or intensifies an electric field for development if short. The intensified electric field increases the gamma of an image and thereby degrades tonality while causing the developer to adhere to the sleeve. While the amount of the developer required to deposit on the sleeve depends on the above gap, an adequate amount has not been defined specifically yet.

Technologies relating to the present invention are disclosed in, e.g., Japanese Patent Laid-Open Publication Nos. 6-222673 and 2000-305360.

SUMMARY OF THE INVENTION

It is an object of the present invention to provide a developing device that enhances image quality and reduces the variation of a load on an image carrier by defining an adequate amount of developer for a gap implementing high image quality, and an image forming apparatus including the same.

A developing device of the present invention includes an image carrier for forming a latent image thereon, and a developer carrier for depositing a developer thereon in the form of a magnet brush. The magnet brush is caused to contact the latent image to thereby develop it. The developer carrier includes a main magnetic pole for development and an auxiliary magnetic pole adjoining the main pole and helping the main pole exert a magnetic force. The developer carrier and said image carrier are spaced by a gap of 0.3 mm or above, but 0.6 mm or below.

An image forming apparatus including the above-described developing device is also disclosed.

BRIEF DESCRIPTION OF THE DRAWINGS

The above and other objects, features and advantages of the present invention will become more apparent from the following detailed description taken with the accompanying drawings in which:

FIG. 21 is a table showing a relation between the half-widths of the poles P1 through P6.

DESCRIPTION OF THE PREFERRED EMBODIMENTS

To better understand the present invention, a relation between a development gap and a carrier packing ratio, which relate to image quality, will be described first. In an image forming apparatus of the type using a toner and carrier mixture, a carrier packing ratio at a developing region relates to image quality. The packing ratio of a carrier present at the developing region is expressed as:

$$(M/h) \times (1/\rho) \times \{C/(T+C)\}$$

where M denotes an amount of developer deposited on a sleeve (g/cm$^2$), h denotes a development gap (cm), $\rho$ denotes a carrier density (g/cm$^3$), and C(T+C) denotes the carrier content of the developer.

The carrier packing ratio, like the development gap, brings about a brush mark if short or causes the developer to adhere to the sleeve if excessive. After a series of researches and experiments, we found that an adequate amount of developer required to deposit on the sleeve for a gap that implements high image quality can be defined if a carrier packing ratio contributing to image quality without bringing about the above problems is determined.

Figure 1:
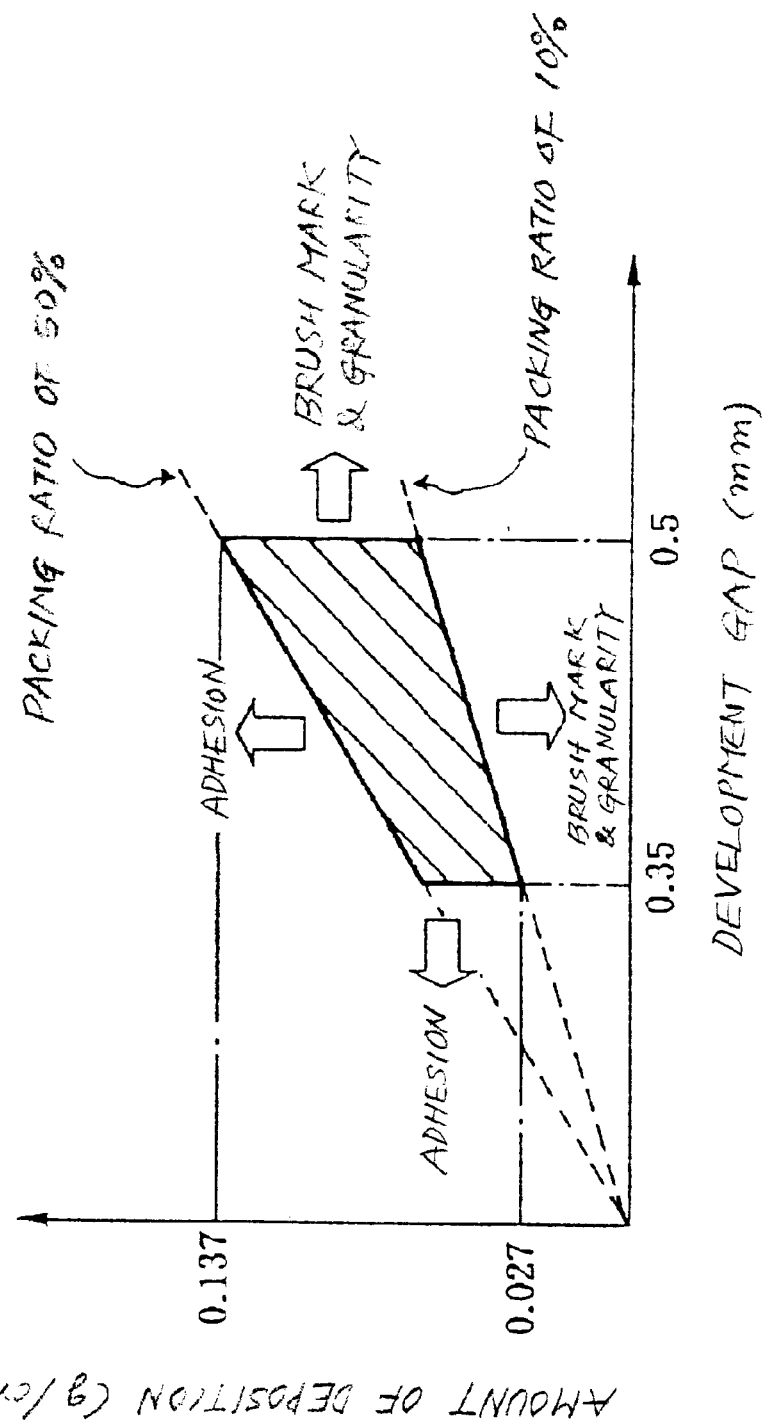
FIG. 1 is a graph showing a relation between a gap for development and a carrier packing ratio relating to image quality.

FIG. 1 is a graph showing a relation between the gap (abscissa) and the amount of developer to deposit on the sleeve (ordinate) particular to an image forming apparatus, which includes a developing device to be described specifically later. The carrier packing ratio brings about the adhesion of the developer if excessive or brings about a brush mark or granularity if short, as stated earlier. Further, the gap enhances the edge effect if excessive or degrades tonality if short. In FIG. 1, neither the adhesion of the developer not the brush mark occurs in a range in which the gap is 0.3 mm to 0.6 mm and the carrier packing ratio is 10% to 50% (0.027 g/cm$^2$ to 0.137 g/cm$^2$ in terms of the amount of developer). In this range, the amount of developer deposited on the sleeve remains preferable for the value of the gap. More preferably, the gap should range from 0.35 mm to 0.5 mm while the carrier packing ratio should range from 15% to 45% (range indicated by hatching). Because the adhesion of the developer to the sleeve decreases, a minimum of variation occurs in the load acting on an image carrier.

Figure 2:
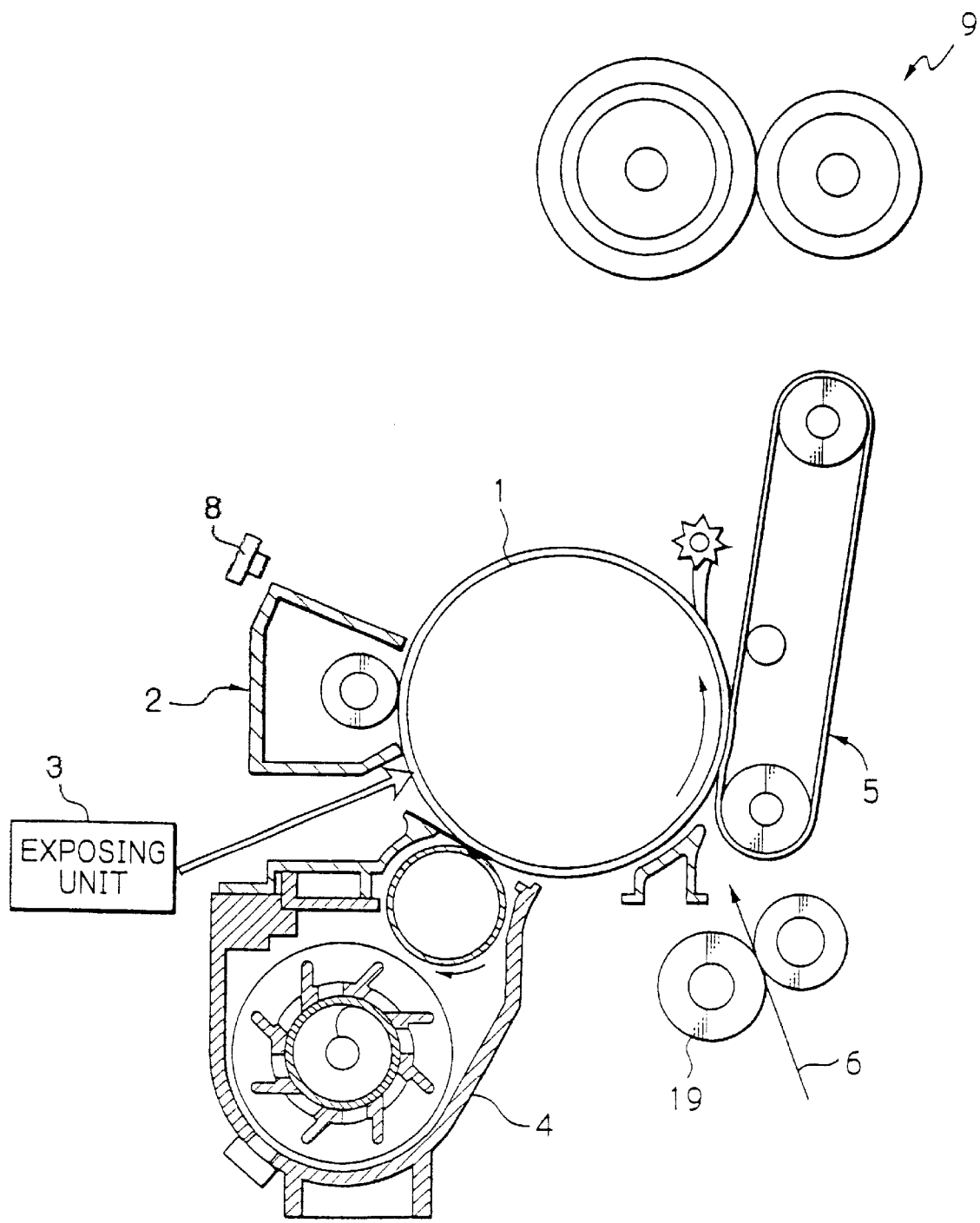
FIG. 2 is a view showing an image forming apparatus on which a developing device in accordance with the present invention is mounted.

Referring to FIG. 2, an image forming apparatus including a developing device embodying the present invention, particularly an image forming section thereof, will be described. As shown, the image forming section includes a drum 1 that is a specific form of an image carrier. Arranged around the drum are a charger 2, an exposing unit 3, a developing device 4, an image transferring device 5, and a discharge lamp 8. The charger 2 uniformly charges the surface of the drum 1 to preselected polarity. The exposing unit 3 scans the charged surface of the drum 1 with a laser beam imagewise for thereby forming a latent image on the drum 1. The developing device 4 develops the latent image with toner to thereby form a corresponding toner image. The image transferring device 5 transfers the toner image from the drum 1 to a paper sheet or similar recording medium 6. The discharge lamp 8 discharges the surface of the drum 1 after the image transfer from the drum 1 to the paper sheet 6.

After the charger 2 has uniformly charged the surface of the drum 1 with a charge roller, the exposing unit 4 exposes the charged surfaced of the drum 1 imagewise for thereby forming a latent image. The developing device 4 develops the latent image with toner to thereby form a corresponding toner image. The image transferring device 5, including a belt by way of example, transfers the toner image from the drum 1 to the paper sheet 6, which is fed from a sheet tray not shown. A peeler 16 peels off the paper sheet 6 electrostatically adhering to the drum 1. A fixing unit 20 fixes the toner image on the paper sheet 6. The discharge lamp 8 initializes the surface of the drum 1 in order to prepare it for the next image formation. The toner left on the drum 1 after the image transfer is conveyed by the drum 1 via the charging position and exposing position to the developing position. At the developing position, the toner is collected from the needless portions of the drum 1 at the same time as development (next development). The reference numeral 19 designates a registration roller pair for driving the paper sheet 6 such that the leading edge of the paper sheet 6 meets the leading edge of the toner image formed on the drum 1.

Figure 3:
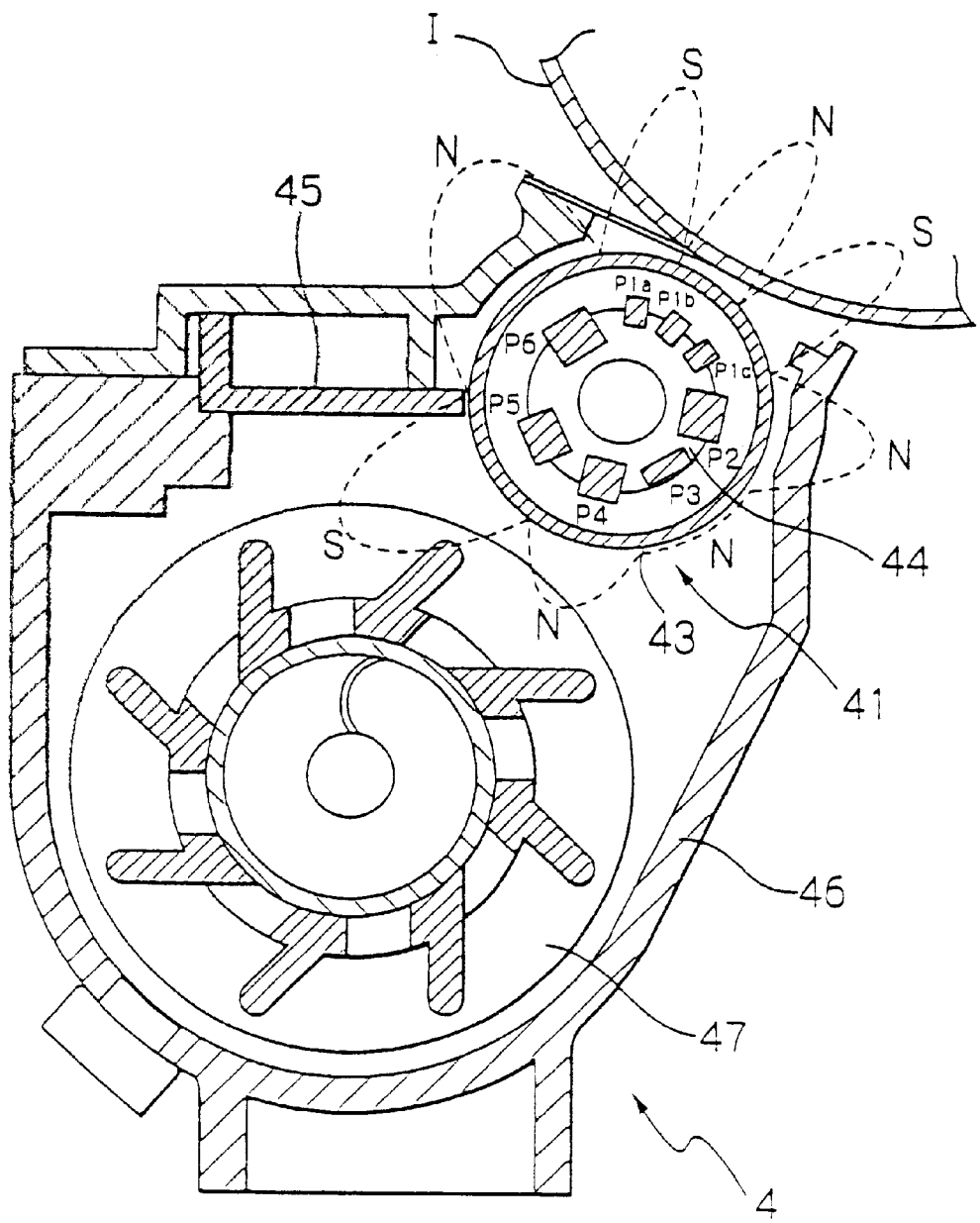
FIG. 3 is a view showing a developing device embodying the present invention in detail.

FIG. 3 shows a specific configuration of the developing device 4. As shown, the developing device 4 includes a developing roller 41 adjoining the drum 1. The developing roller 41 and drum 1 form a developing region therebetween where a magnet brush contacts the drum 1. The developing roller 41 includes a cylindrical sleeve 43 formed of aluminum, brass, stainless steel, conductive resin or similar magnetic material. A drive mechanism, not shown, causes the sleeve 43 to rotate clockwise, as viewed in FIG. 2, or in a direction of developer conveyance.

In the illustrative embodiment, the drum 1 has a diameter of 60 mm and moves at a linear velocity of 240 mm/sec. The sleeve 43 has a diameter of 20 mm and moves at a linear velocity of 600 mm/sec, which is 2.5 times as high as the linear velocity of the drum 1. A development gap between the drum 1 and the sleeve 43 is 0.4 mm. For a mean carrier particle size of 50 $\mu$m, the development gap has customarily been about 0.65 mm to about 0.8 mm, which is ten times or more as great as the developer particle size. A required image density is achievable even if the ratio in linear velocity of the sleeve 43 to the drum 1 is reduced to 1.1.

A doctor blade or metering member 45 is positioned upstream of a developing region in the direction of developer conveyance for regulating the height of a magnet brush formed on the sleeve 43. A doctor gap between the doctor blade 45 and the sleeve 43 is selected to be 0.4 mm. A screw 47 is positioned at the opposite side to the drum 1 with respect to the developing roller 41. The screw 47 scoops up the developer stored in a casing 46 to the developing roller 41 while agitating it.

A magnet roller 44 is held stationary within the sleeve 43 for causing the developer to form a magnet brush on the sleeve 43. Specifically, the magnet roller 44 causes the carrier of the developer to rise on the sleeve 43 in the form of chains along magnetic lines of force normal to the sleeve 43. The toner of the developer deposits on the carrier or chains, forming the magnet brush. The sleeve 43 conveys the magnet brush formed thereon in the clockwise direction.

The magnet roller 44 has a plurality of magnetic poles or magnets P1$a$ through P1$b$ and P2 through P6. The pole or main pole P1$b$ causes the developer to rise in the developing region where the sleeve 43 and drum 1 face each other. The poles P1$a$ and P1$c$ help the main pole P1$b$ exert such a magnetic force. The pole P4 scoops up the developer to the sleeve 43. The poles P5 and P6 convey the developer to the developing region. The poles P2 and P3 convey the developer in a region following the developing region. All of the poles of the magnet roller 44 are oriented in the radial direction of the sleeve 43. While the magnet roller 44 is shown as having eight poles, additional poles may be arranged between the pole P3 and the doctor blade 45 in order to enhance the scoop-up of the developer and the ability to follow a black solid image. For example, two to four additional poles may be arranged between the pole P3 and the doctor blade 45.

As shown in FIG. 3, the poles P1a through P1c are sequentially arranged from the upstream side to the downstream side in the direction of developer conveyance, and each is implemented by a magnet having a small sectional area. While such magnets are formed of a rate earth metal alloy, they may alternatively be formed of, e.g., a samarium alloy, particularly a samarium-cobalt alloy. An iron-neodymium-boron alloy, which is a typical rare earth metal alloy, has the maximum energy product of 358 kJ/m$^3$. An ion-neodium-boron alloy bond, which is another typical rare earth metal, has the maximum energy product of 80 kJ/m$^3$ or so. Such magnets guarantee magnetic forces required of the surface of the developing roller 41 despite their small sectional area. A ferrite magnet and a ferrite bond magnet, which are conventional, respectively have the maximum energy products of about 36 kJ/m$^3$ and 20 kJ/m$^3$. If the sleeve 43 is allowed to have a greater diameter, then use maybe made of ferrite magnets or ferrite bond magnets each having a relatively great size or each having a tip tapered toward the sleeve 43 in order to reduce a half width.

Figure 4:
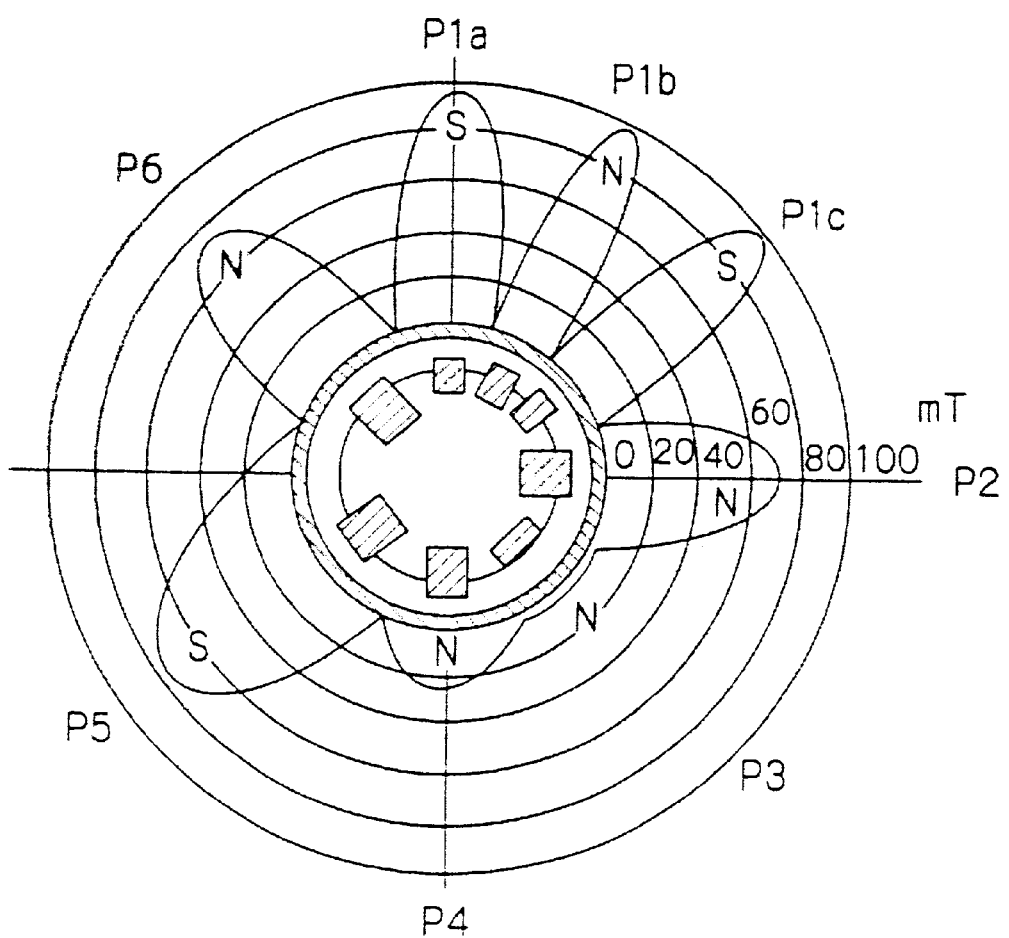
FIG. 4 is a chart showing the magnetic force distribution and its size available with a developing roller included in the illustrative embodiment.

In the above specific configuration, the main pole P1b and poles P4, P6, P2 and P3 are N poles while the poles P1a, P1c and P5 are S poles. As shown in FIG. 4, the main magnet P1b had a magnetic force of 85 mT or above, as measured on the developing roller 41. It was experimentally found that if the main pole P1b and auxiliary pole downstream of the main pole P1b had a magnetic force of 60 mT or above, defects including the deposition of the carrier were obviated. The magnet P2 downstream of the main magnet P1 presumably helps the main magnet P1 exert the main magnetic force. The deposition of the carrier occurred when the above magnetic force was less than 60 mT. Magnetic forces contributing to the deposition of the carrier are tangential to the developing roller 41. While the magnetic forces of the magnets P1a through P1c must be intensified to intensify the tangential magnetic forces, the deposition of the carrier can be reduced only if any one of such magnetic forces is intensified. The magnets P1a through P1c each had a width of 2 mm while the magnet P1b had a half width of 16°.

Figure 5:
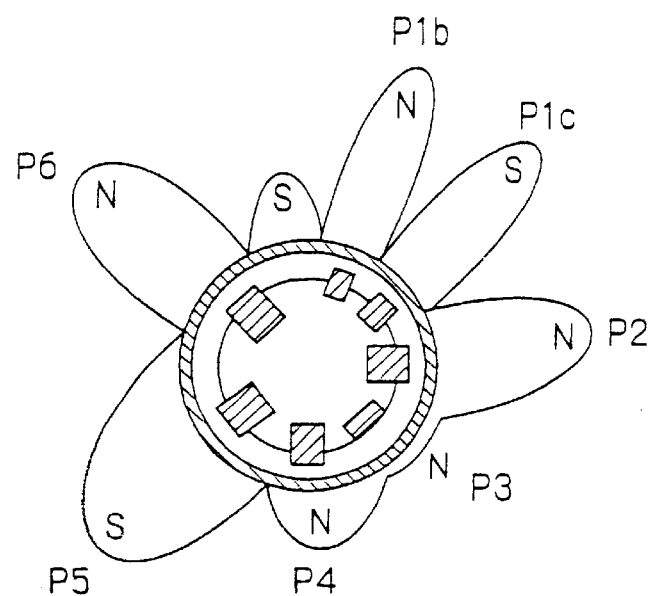
FIG. 5 is a chart showing the magnetic force distribution and its size available when an auxiliary magnetic pole is absent.

As shown in FIG. 5, only the auxiliary magnet P1c may be positioned downstream of the main magnet P1b. In this configuration, the half width of the main magnet P1b is the same as in the configuration or FIG. 4; the magnetic force of the main pole P1b decreases only by several percent. While the auxiliary magnet P1a is absent at the upstream side of the main magnet P1b, the magnetic force at the upstream side decreases to about 30 mT, as determined by experiments. However, this position is usually shielded by an inlet seal and not exposed to the image forming section, so that the developer can be fed to the main pole.

Figure 6:
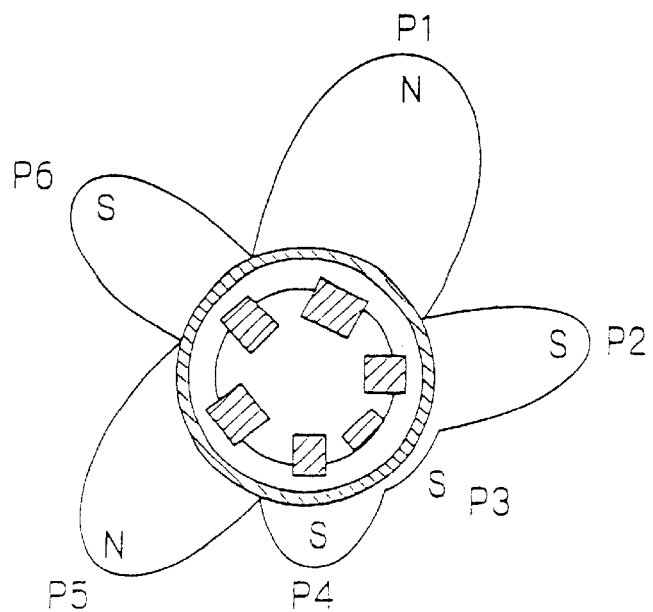
FIG. 6 is a chart showing a magnetic force distribution of a conventional developing roller for comparison.

By reducing the width of the magnet, it is possible to further reduce the half width, as determined by experiments. When the main pole was implemented by a 1.6 mm wide magnet, the half width was as small as 12°. As FIG. 3 indicates, the maximum magnetic force of the main magnet P1b in the normal direction is 90 mT. In this case, the half width is 45 mT while its angular width is 25°. Half widths above 25° resulted in defective images. For comparison, FIG. 6 shows a magnetic force distribution particular to the conventional magnet roller.

Figure 7:
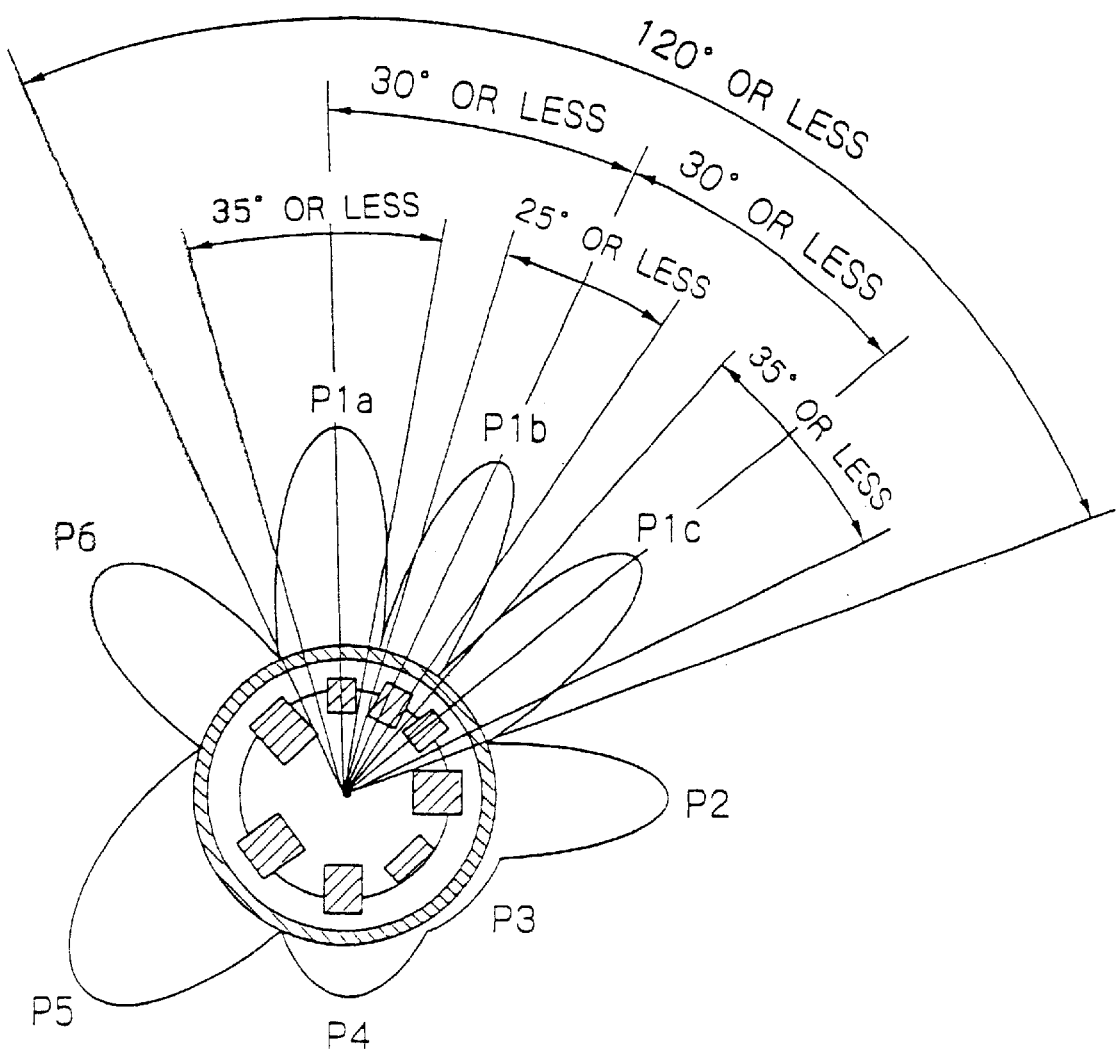
FIG. 7 is a chart showing a relation between a main magnet and magnets adjoining it.

In the illustrative embodiment, the half width of each of the auxiliary magnets P1a and P1c is selected to be 35° or below. This half width cannot be reduced relatively because the magnets P2 and P6 positioned outside of the magnets P1a and P1c have great half widths. FIG. 7 shows a positional relation between the main magnet P1b and the auxiliary magnets P1a and P1c. As shown, the angle between the each of the auxiliary magnets P1a and P1c and the main magnet P1b is selected to be 30° or below. More specifically, because the half width of the main pole P1a is 16°, the above angle is selected to be 25°. Further, the angle between the transition point (0 mT) between the magnets P1a and P6 and the transition point (0 mT) between the magnets P1c and P2 is selected to be 120° or below. The transition point refers to a point where the N pole and S pole replace each other.

Figure 8:
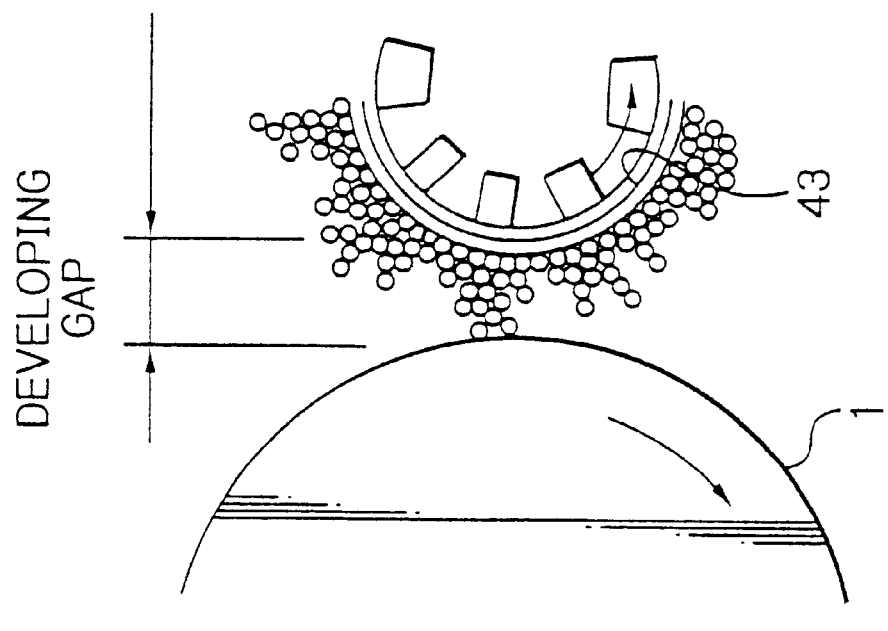
FIG. 8 is a view showing the size of the development gap and that of a nip.
Figure 9:
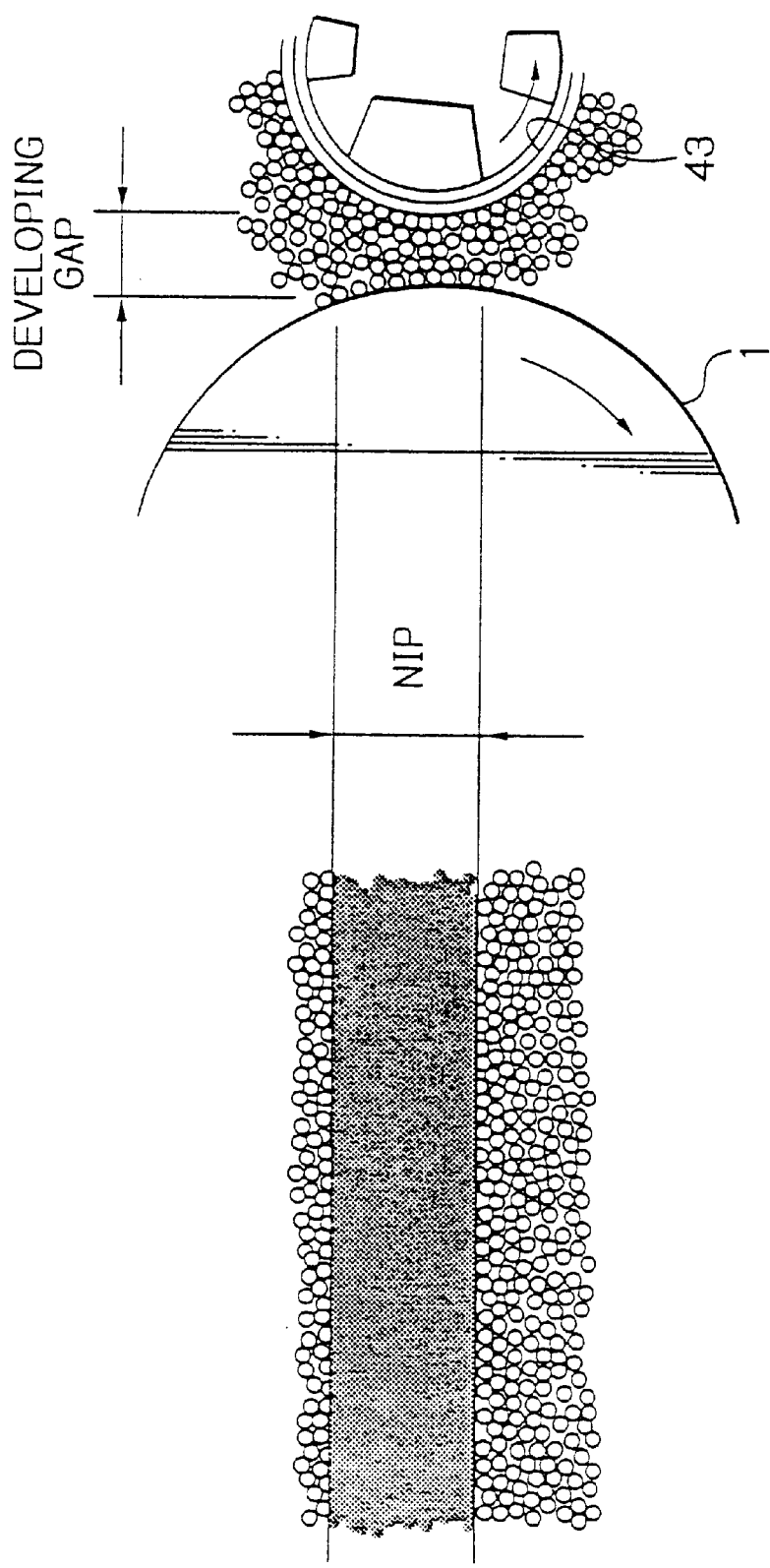
FIG. 9 is a view showing the size of the development gap and that of the nip of a conventional arrangement for comparison.

So long as the magnet brush contacts the drum 1 under the above conditions, the nip is greater than or equal to the particle size of the developer, but smaller than or equal to 2 mm, obviating the omission of a trailing edge. In addition, even a horizontal thin line and a single dot or similar small image can be sufficiently formed. FIGS. 8 and 9 respectively show a condition particular to this specific configuration and a conventional condition for comparison.

When the root portion of the magnet brush where the brush starts rising under the action of the main magnet P1b is 2 mm wide or less, the nip for development can be 2 mm wide or less.

Why the illustrative embodiment increases image density will be described hereinafter. The magnet roller of the illustrative embodiment reduces the height of the magnet brush to be formed by the main pole P1b and reduces the nip width for development, as stated above. Therefore, when the sleeve 43 conveys the magnet brush via the main pole P1, the brush starts rising and moves away from the nip in a shorter period of time; the linear velocity ratio of the brush to the drum 1 was found higher at this position than at the other positions. As a result, the amount of developer to contact the drum 1 increases and increases image density. Moreover, the small nip width reduces the amount of developer to stay at a position immediately preceding the nip, thereby reducing countercharge. This prevents image density from decreasing and thereby enhances the developing ability of the developing device.

While the illustrative embodiment has concentrated on three magnets forming the main pole for development, the number of magnets for forming the main pole is open to choice so long as the sufficiently strong electric field can be formed at the boundary of the developing region.

Figure 10:
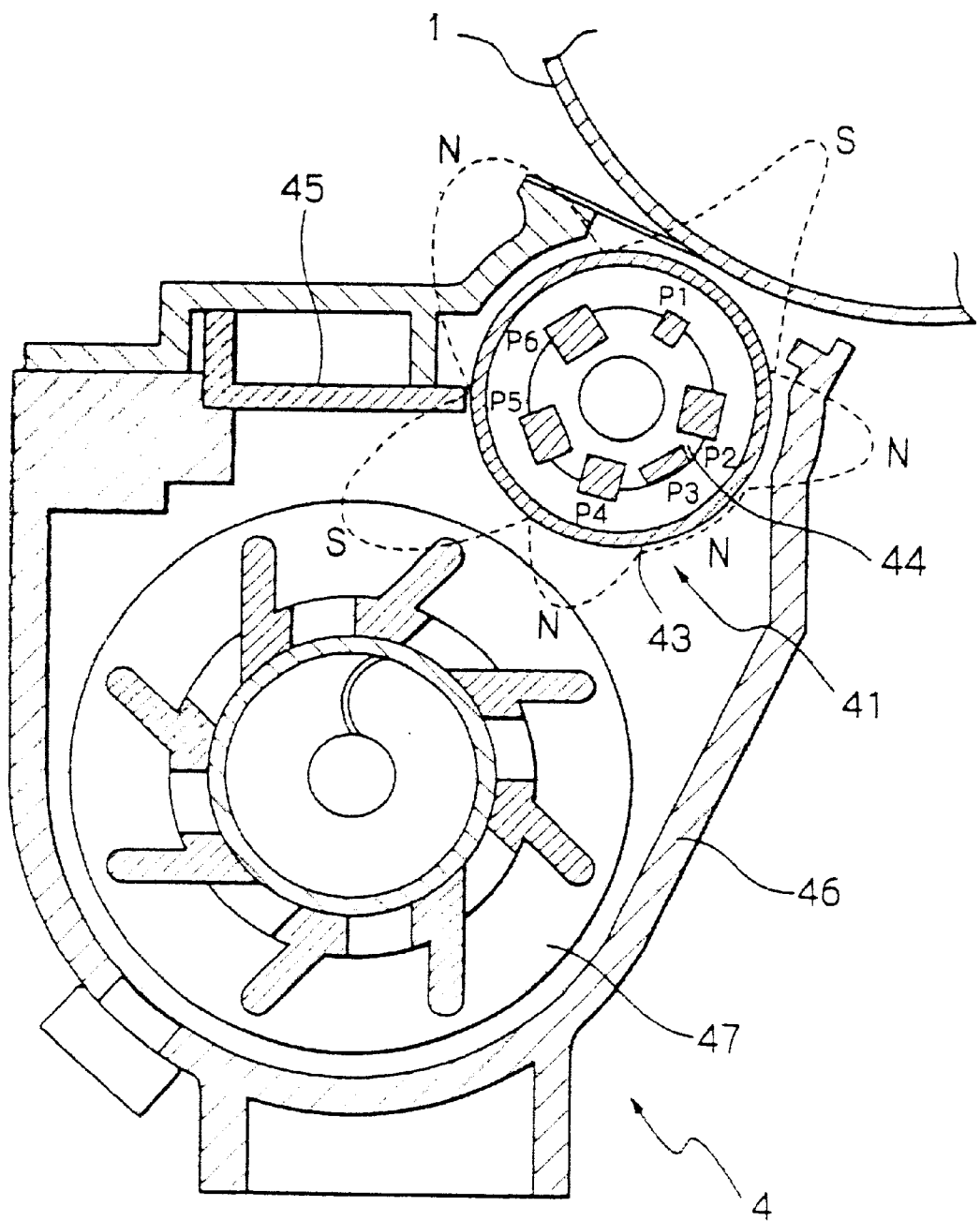
FIG. 10 is a view showing an alternative embodiment of the present invention.
Figure 11:
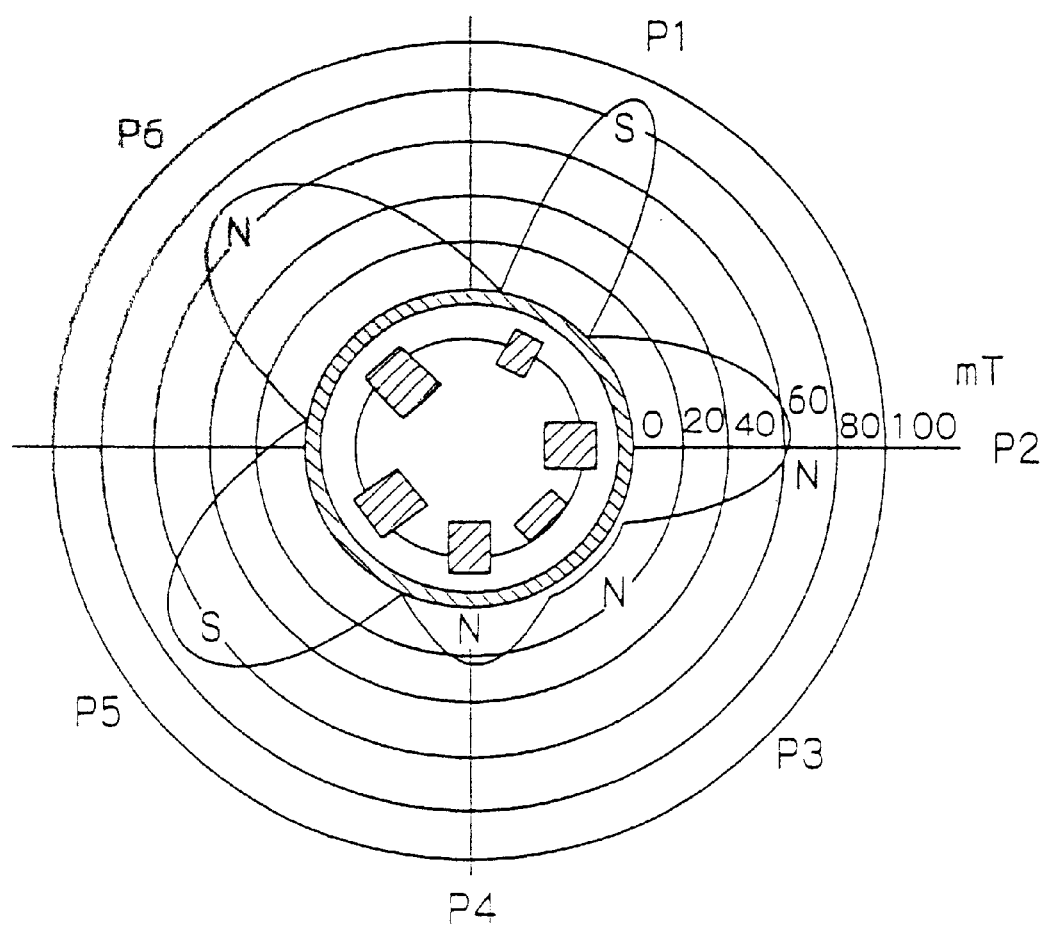
FIG. 11 is a chart showing the magnetic force distribution and the size thereof available with the alternative embodiment.

Reference will be made to FIG. 10 for describing an alternative embodiment of the present invention in which a single magnet forms the main pole for development. Symbols identical with the symbols of the previous embodiment designate identical structural elements. As shown, the developing device 4 includes the developing roller 41 adjoining the drum 1. The developing roller 41 and drum 1 form a developing region therebetween where a magnet brush contacts the drum 1. The developing roller 41 includes a cylindrical sleeve 43 formed of aluminum, brass, stainless steel, conductive resin or similar magnetic material. A drive mechanism, not shown, causes the sleeve 43 to rotate clockwise, as viewed in FIG. 14.

In the illustrative embodiment, the drum 1 has a diameter of 60 mm and moves at a linear velocity of 240 mm/sec. The sleeve 43 has a diameter of 20 mm and moves at a linear velocity of 600 mm/sec, which is 2.5 times as high as the linear velocity of the drum 1. The development gap between the drum 1 and the sleeve 43 is 0.4 mm. For a mean carrier particle size of 50 μm, the development gap has customarily been about 0.65 mm to about 0.8 mm, which is ten times or more as great as the developer particle size. A required image density is achievable even if the ratio in linear velocity of the sleeve 43 to the drum 1 is reduced to 1.1.

The doctor blade or metering member 45 is positioned upstream of a developing region in the direction of developer conveyance for regulating the height of a magnet brush formed on the sleeve 43. A doctor gap between the doctor blade 45 and the sleeve 43 is selected to be 0.4 mm. The screw 47 is positioned at the opposite side to the drum 1 with respect to the developing roller 41. The screw 47 scoops up the developer stored in a casing 46 to the developing roller 41 while agitating it.

The magnet roller 44 is held stationary within the sleeve 43 for causing the developer to form a magnet brush on the sleeve 43. Specifically, the magnet roller 44 causes the carrier of the developer to rise on the sleeve 43 in the form of chains along magnetic lines of force normal to the sleeve 43. The toner of the developer deposits on the carrier or chains, forming the magnet brush. The sleeve 43 conveys the magnet brush formed thereon in the clockwise direction.

The magnet roller 44 has a plurality of magnetic poles or magnets P1 through P6. The pole or main pole P1 causes the developer to rise in the developing region where the sleeve 43 and drum 1 face each other. The pole P4 scoops up the developer to the sleeve 43. The poles P5 and P6 convey the developer to the developing region. The poles P2 and P3 convey the developer in a region following the developing region. All of the poles of the magnet roller 44 are oriented in the radial direction of the sleeve 43. While the magnet roller 44 is shown as having six poles, additional poles may be arranged between the pole P3 and the doctor blade 45 in order to enhance the scoop-up of the developer and the ability to follow a black solid image. For example, two or more additional poles may be arranged between the pole P3 and the doctor blade 45.

As shown in FIG. 10, the main pole P1 is implemented by a magnet having a small cross-sectional area. While such a magnet is formed of a rate earth metal alloy, it may alternatively be formed of, e.g., a samarium alloy, particularly a samarium-cobalt alloy. An iron-neodium-boron alloy, which is a typical rare earth metal alloy, has the maximum energy product of 358 kJ/m$^3$. An ion-neodium-boron alloy bond, which is another typical rare earth metal, has the maximum energy product of 80 kJ/m$^3$ or so. Such a magnet guarantees a magnetic force required of the surface of the developing roller 41 despite its small sectional area. A ferrite magnet and a ferrite bond magnet, which are conventional, respectively have the maximum energy products of about 36 kJ/m$^3$ and 20 kJ/m$^3$. If the sleeve 43 is allowed to have a greater diameter, then use may be made of a ferrite magnet or a ferrite bond magnet having a relatively great size or having a tip tapered toward the sleeve 43 in order to reduce a half width.

Figure 15:
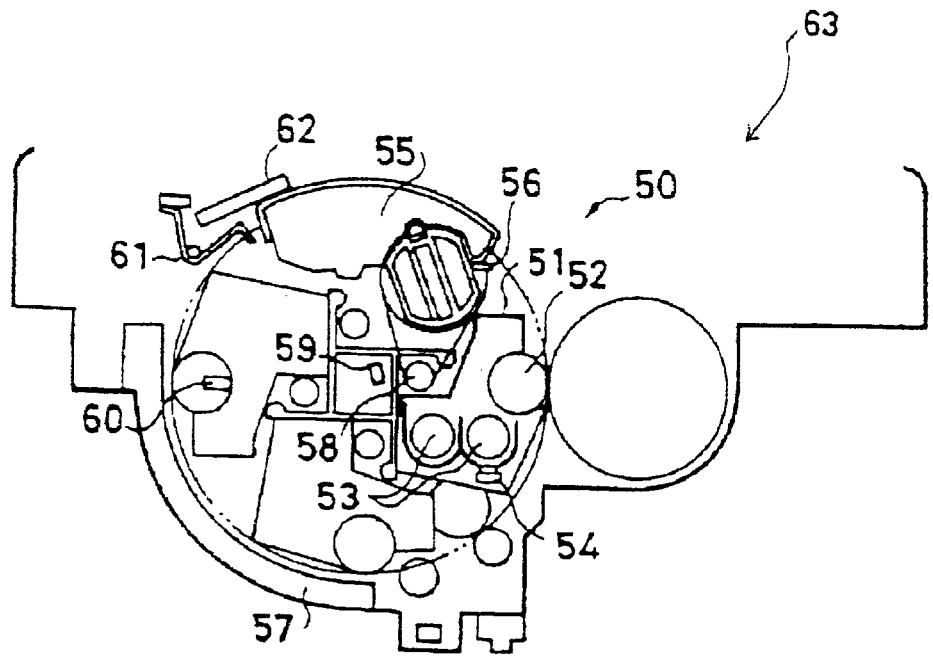
FIG. 15 is a section showing the major part of a developing unit included in the apparatus of FIG. 14.

In the illustrative embodiment, the poles P4, P6, P2 and P3 are N poles while the poles P1 and P5 are S poles. As shown in FIG. 15, the main magnet P1 had a magnetic force of 85 mT or above, as measured on the developing roller 41. It was experimentally found that if the main pole P1 had a magnetic force of 60 mT or above, defects including the deposition of the carrier were obviated. The magnet P2 downstream of the main magnet P1 presumably helps the main magnet P1 exert the main magnetic force. The deposition of the carrier occurred when the above magnetic force was less than 60 mT. The magnet P1 had a width of 2 mm while the magnet P1 had a half width of 22°.

By reducing the width of the magnet, it is possible to further reduce the half width, as determined by experiments. When the main pole was implemented by a 1.6 mm wide magnet, the half width was as small as 16°. Half widths above 25° resulted in defective images. For comparison, FIG. 6 shows a magnetic force distribution particular to the conventional magnet roller.

Figure 16:
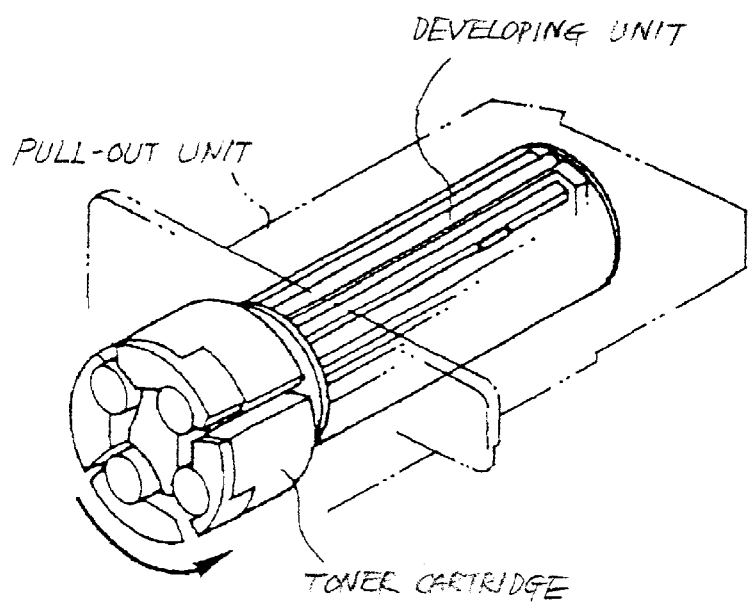
FIG. 16 is a perspective view showing a revolver developing mechanism included in the developing unit.

FIG. 21 is a table showing examples 1 through 5 and comparative examples 1 through 3 each showing a relation between the half widths of the poles P1 through P6. The half width of the pole P1 was used as a reference. In FIG. 16, symbol "-" indicates that a half width could not be determined. The polarities shown in FIG. 16 are only illustrative. For example, the pole P1 may be a S pole. Also, the poles P1 through P5 may be a N pole, a N pole, a N pole, a S pole and a N pole, respectively. In all of Examples 1 through 5, the pole P1 exerts a weaker magnetic force than the other poles P2 through P5 in order to obviate defective images. Comparative Examples 1 through 3 brought about defects including the omission of a trailing edge and a poor horizontal/vertical ratio.

Figure 12:
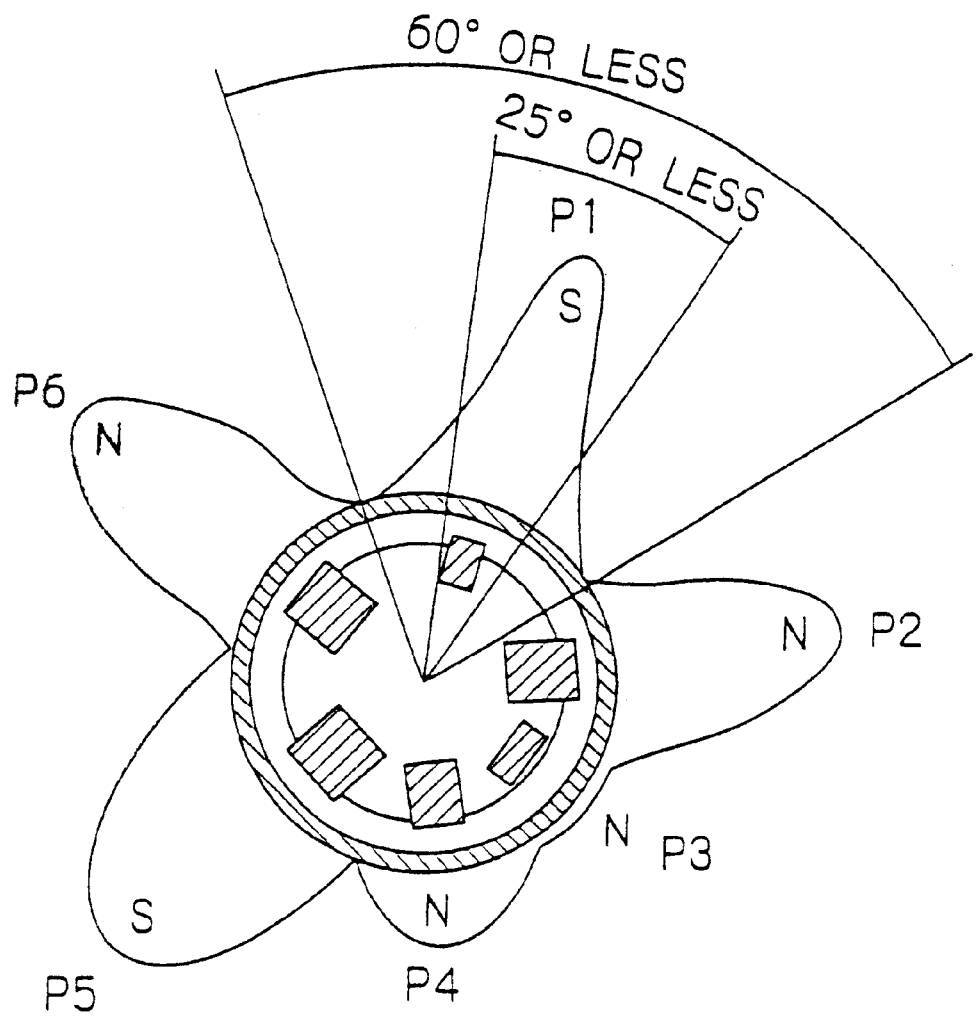
FIG. 12 is a table comparing examples and comparative examples as to half width.

Further, as shown in FIG. 12, the angle between the transition point between the main pole P1 and the pole P2 and the transition point between the main pole P1 and the pole 6 is selected to be 60° or below.

Figure 13:
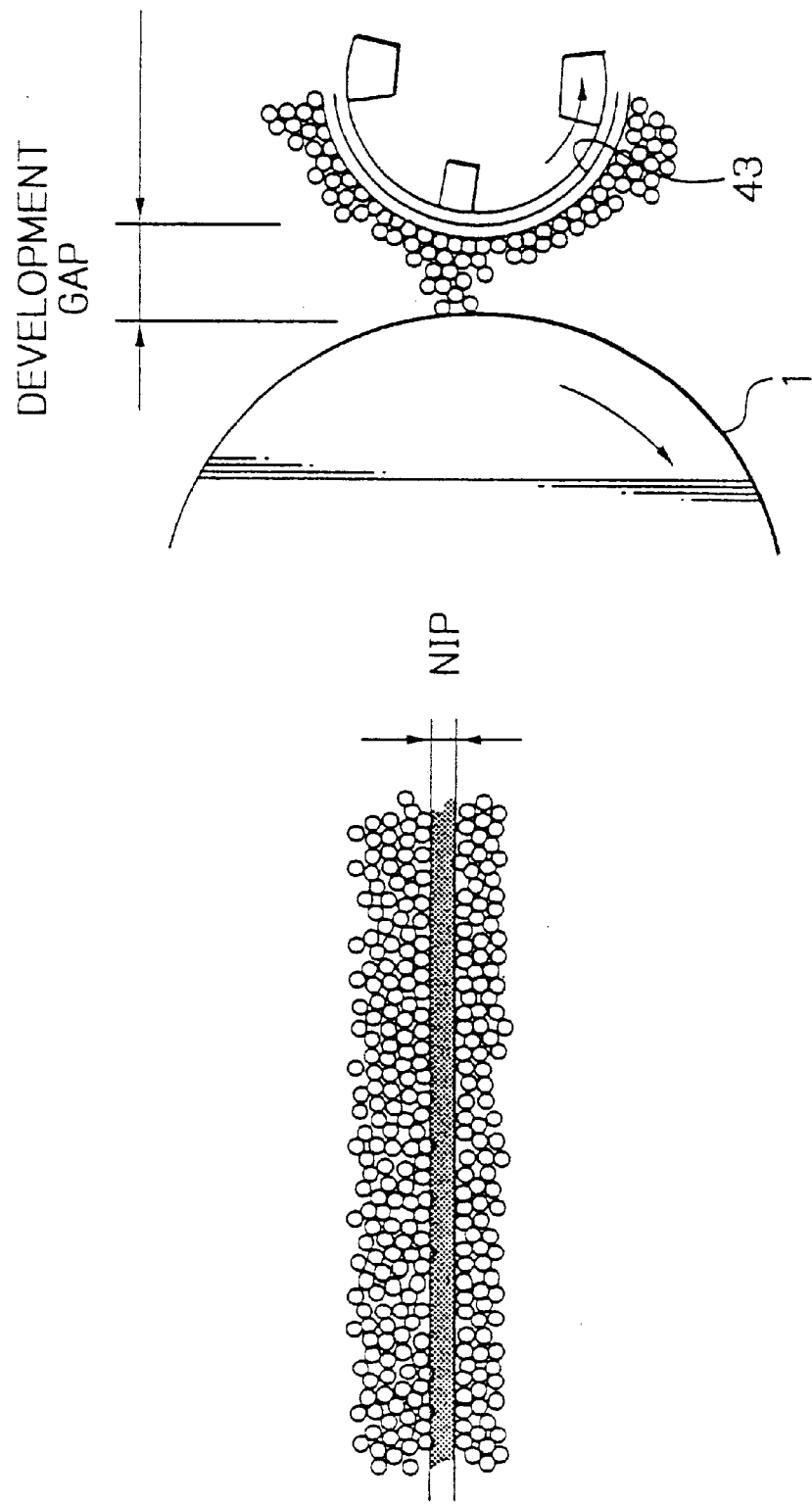
FIG. 13 is a view showing the size of the development gap and that of a nip.

So long as the magnet brush contacts the drum 1 under the above conditions, the nip is greater than or equal to the particle size of the developer, but smaller than or equal to 2 mm, obviating the omission of a trailing edge. In addition, even a horizontal thin line and a single dot or similar small image can be sufficiently formed. FIG. 13 shows a condition particular to this specific configuration. FIG. 13 is contrastive to FIG. 9.

When the root portion of the magnet brush where the brush starts rising under the action of the main magnet P1b is 2 mm wide or less, the nip for development can be 2 mm wide or less.

Why the illustrative embodiment increases image density will be described hereinafter. The magnet roller of the illustrative embodiment reduces the height of the magnet brush to be formed by the main pole P1b and reduces the nip width for development, as stated above. Therefore, when the sleeve 43 conveys the magnet brush via the main pole P1, the brush starts rising and moves away from the nip in a shorter period of time; the linear velocity ratio of the brush to the drum 1 was found higher at this position than at the other positions. As a result, the amount of developer to contact the drum 1 increases and increases image density. Moreover, the small nip width reduces the amount of developer to stay at a position immediately preceding the nip, thereby reducing countercharge. This prevents image density from decreasing and thereby enhances the developing ability of the developing device.

Figure 14:
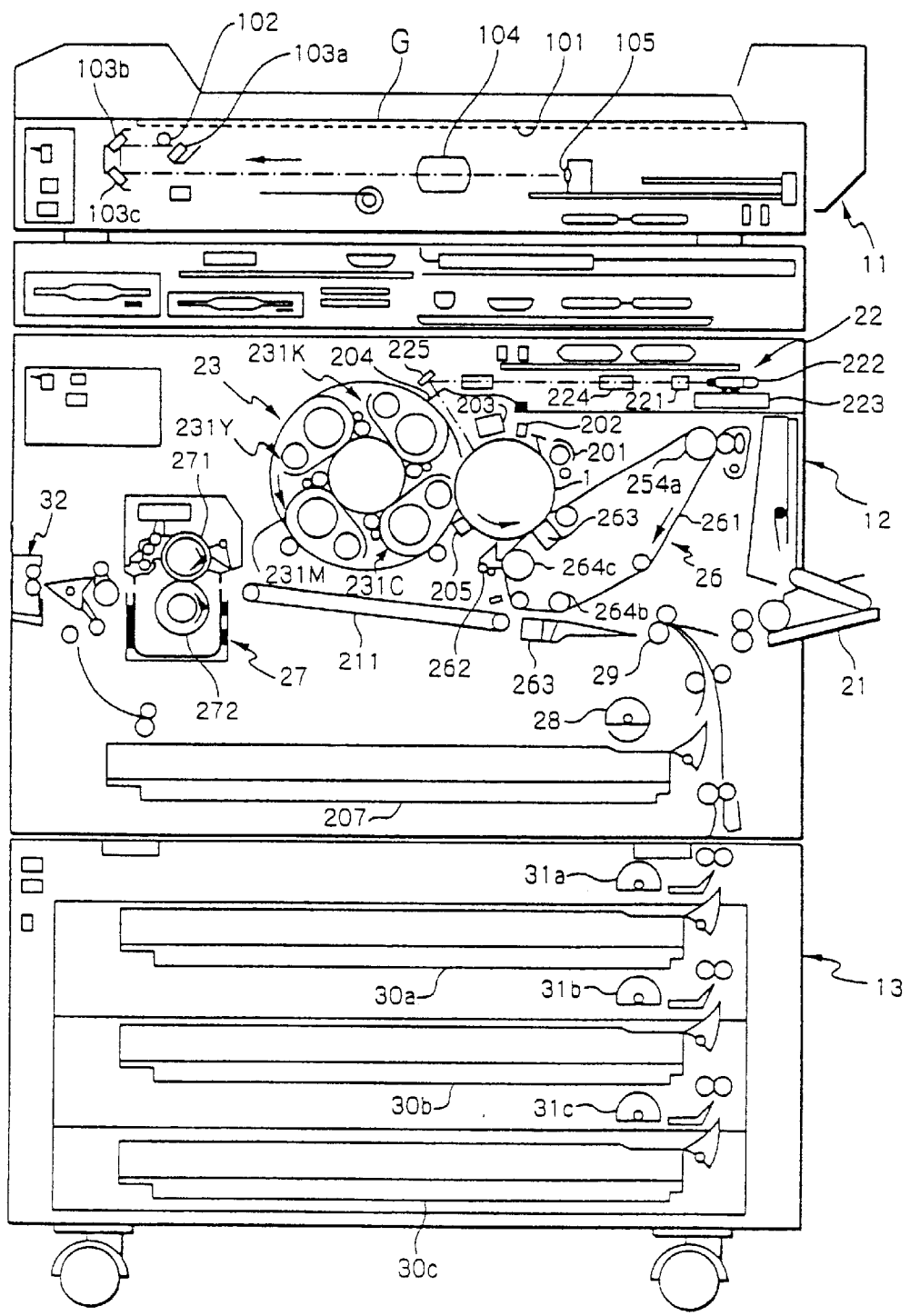
FIG. 14 is a view showing an image forming apparatus to which the present invention is applicable.

Reference will be made to FIG. 14 for describing an image forming apparatus to which the illustrative embodiment is applied and implemented as an electrophotographic color copier by way of example. As shown, the color copier includes a color scanner or image reading device 11, a color printer or image recording device 12, and a sheet bank 13.

The color scanner 11 includes a lamp 102 for illuminating a document G laid on a glass platen 101. The resulting reflection from the document G is incident to a color image sensor 105 via mirrors 103a, 103b and 103c and a lens 104. The color image sensor 105 reads color image data representative of the document G color by color, e.g., red (R), green (G) and blue (B) while converting them to corresponding image signals. Specifically, the color image sensor 105 includes R, G and B color separating means and a CCD (Charge Coupled Device) or similar photoelectric transducer and reads three different color image data at the same time. An image processing section, not shown, transforms the color image signals to black (Bk), cyan (C), magenta (M) and yellow (Y) color image data on the basis of a signal level.

More specifically, in response to a scanner start signal synchronous to the operation of the color printer 12, optics made up of the lamp 102 and mirrors 103a through 103c sequentially scans the document G to the left, as viewed in FIG. 14. The color scanner 11 outputs color data of one color every time the optics scans the document. By repeating such scanning four consecutive times, the color scanner 11 sequentially outputs color image data of four different colors. The color printer 12 forms a single toner image every time it receives the color image data of one color from the color scanner 11. The color printer 12 transfers the resulting toner images of four different colors to an intermediate image transfer belt 261, which will be described later, one above the other, thereby completing a full-color image.

The color printer 12 includes the drum 1, an optical writing unit 22, a revolver or developing device 23, an intermediate image transferring unit 26, and a fixing unit 27. The drum 1 is rotatable counterclockwise, as indicated by an arrow in FIG. 13. Arranged around the drum 1 are a drum cleaner 201, a discharge lamp 202, a charger 203, a potential sensor 204, one of developing units arranged in the revolver 23, a density sensor 205, and the intermediate image transfer belt 261 included in the intermediate image transferring unit 26.

The optical writing unit 22 transforms the color image data received from the color scanner 11 to an optical signal and scans the drum 1 in accordance with the optical signal, thereby forming a latent image on the drum 1. The writing unit 22 includes a semiconductor laser or light source 221, a laser driver, not shown, a polygonal mirror 222, a motor 223 for driving the mirror 222, an f/θ lens 224, and a mirror 225.

The revolver 23 includes a Bk developing unit 231K, a C developing unit 231C, a M developing unit 231M and a Y developing unit 231Y as well as a drive section for rotating the revolver 23 in a direction indicated by an arrow in FIG. 23. The developing units 231K through 231Y each are constructed in the same manner as the developing device 4 shown in FIGS. 2. Specifically, the developing units 231K through 231Y each include a developing sleeve rotatable with a magnet brush formed thereon contacting the surface of the drum 1 and a paddle rotatable to scoop up and agitate a developer. In each of the developing units 231K through 231Y, the toner of the developer is charged to negative polarity by being agitated together with a ferrite carrier. A negative DC voltage Vdc on which an AC voltage Vac is superposed is applied to the developing sleeve as a bias for development. The bias biases the developing sleeve to a preselected potential relative to a metallic core included in the drum 1.

While the copier is in a standby state, the revolver 23 is positioned such that the developing unit 231K is located at a developing position where it faces the drum 1. On the start of a copying operation, the color scanner I starts reading Bk color image data at preselected timing. The writing unit 22 starts forming a latent image on the drum 1 with a laser beam in accordance with the above color image data. Let this latent image be referred to as a Bk latent image for convenience. This is also true with latent images corresponding to the other colors C, M and Y.

The Bk developing sleeve starts rotating before the leading edge of the Bk latent image arrives at the developing position. As a result, the Bk latent image is developed by Bk toner to become a Bk toner image. As soon as the trailing edge of the Bk latent image moves away from the developing position, the revolver 23 is rotated to locate the next developing unit (C developing unit) at the developing position. This rotation of the revolver 23 completes at least before the leading edge of a latent image derived from the next color data arrives at the developing position.

The intermediate image transferring unit 26 includes a belt cleaner 262 and a corona discharger 263 in addition to the intermediate image transfer belt 261. The belt 261 is passed over a drive roller 264a, a roller 264b assigned to image transfer, a roller 264c assigned to belt cleaning, and a plurality of driven rollers. A motor, not shown, drives the belt 261. The belt cleaner 262 includes an inlet seal, a rubber blade, a discharge coil, and a mechanism for moving the inlet seal and a rubber blade. While toner images of the second, third and fourth colors are sequentially transferred from the drum to the belt 261 after a toner image of the first color, the above mechanism maintains the inlet seal and rubber blade spaced from the belt 261. The corona discharger 263 applies either a DC voltage or an AC-biased DC voltage to the belt 261 by corona discharge, causing a full-color image to be transferred from the belt 261 to a paper sheet or similar recording medium.

The color printer 12 additionally includes a sheet cassette 207 in addition to the previously mentioned sheet bank 13. The sheet bank 13 includes sheet cassettes 30a, 30b and 30c each being loaded with a stack of paper sheets of particular size. Pickup rollers 28, 31a, 31b and 31c are associated with the sheet cassettes 207, 30a, 30b and 30c, respectively. Paper sheets are sequentially fed from designated one of the paper cassettes 207 and 31a through 31c by associated one of the pickup rollers 28 and 31 through 31c to a registration roller pair 29. If desired, an OHP (OverHedad Projector) form, a relatively thick sheet or similar special sheet may be fed by hand from a manual feed tray 21.

On the start of an image forming cycle, the drum 1 is caused to start rotating counterclockwise by the motor. Likewise, the belt 261 is caused to start turning clockwise by the motor. A Bk toner image, a C toner image, a M toner image and a Y toner image are sequentially formed while the belt 261 is in rotation, and sequentially transferred to the belt 261 one above the other, completing a full-color image.

More specifically, the charger 203 uniformly charges the surface of the drum 1 to about −700 V by corona discharge. The semiconductor laser 221 scans the charged surface of the drum 1 by raster scanning in accordance with Bk color image data. As a result, the scanned or exposed portion of the drum 1 looses its charge in proportion to the quantity of incident light, so that a Bk latent image is formed. Bk toner deposited on the Bk developing sleeve contacts the Bk latent image and deposits only on the exposed portion of the drum 1, thereby forming a corresponding Bk toner image. A belt transfer unit 265 transfers the Bk toner image from the drum 1 to the belt 261, which is turning at the same speed as the drum 1 in contact with the drum 1 (primary image transfer).

The drum cleaner 201 removes some toner left on the drum 1 after the primary image transfer. The toner collected by the drum cleaner 201 is stored in a waste toner tank via a piping although not shown specifically.

After the formation and transfer of the Bk toner image, the color scanner I starts reading C image data at preselected timing. The laser 221 forms a C latent image on the drum 1 in accordance with the C image data. After the passage of the trailing edge of the Bk latent image, but before the arrival of the leading edge of the C latent image, the revolve 23 brings the developing unit 231C to the developing position. The developing unit 231C develops the C latent image with C toner for thereby forming a C toner image. After the trailing edge of the C latent image has moved away from the developing position, the revolver 23 is again rotated to bring the developing unit 231M to the developing position. This rotation also completes before the leading edge of a M latent image arrives at the developing position. The procedure described above is repeated with M and Y color image data to thereby form a M and a Y toner image.

The Bk, C, M and Y toner images sequentially transferred from the drum 1 to the belt 261 one above the other, i.e., a full-color image is transferred to a paper sheet by the corona discharger 263.

The paper sheet is fed from any one of the sheet cassettes and manual feed tray when the above-described image forming operation begins, and is waiting at the nip of the registration roller pair 29. The registration roller pair 29 conveys the paper sheet such that the leading edge of the paper sheet meets the leading edge of the toner image conveyed by the belt 261 to the corona discharger 263. The corona discharger 263 charges the paper sheet to positive polarity by corona discharge, thereby transferring the toner image from the belt 261 to the paper sheet (secondary image transfer). Subsequently, an AC+DC corona discharger, not shown, located at the left-hand side of the corona discharger 263, as viewed in FIG. 53, discharges the paper sheet to thereby separate it from the belt 261.

A belt 211 conveys the paper sheet carrying the toner image thereon to the fixing unit 27. In the fixing unit 27, a heat roller 271 and a press roller 272 fix the toner image on the paper sheet with heat and pressure. An outlet roller pair 32 drives the paper sheet coming out of the fixing unit 27 out of the apparatus. The paper sheet or copy is stacked on a copy tray, not shown, face up.

After the secondary image transfer, the drum cleaner 201 cleans the surface of the drum 1 with the brush roller and rubber blade. Subsequently, the discharge lamp 202 discharges the surface of the drum 1. At the same time, the previously mentioned mechanism again presses the blade of the belt cleaner 262 against the surface of the belt 261 to thereby clean it.

The developing section of the color copier will be described more specifically with reference to FIGS. 15 through 20. As shown in FIG. 15, the developing section includes a developing unit implemented as a revolver 50, which corresponds to the revolver 23 shown in FIG. 14. The revolver 50 includes cases 51 each storing one of Y, M, C and Bk toner. The revolver 50 sequentially positions the Bk, Y, C and M cases 51 at the developing position in this order when rotated.

Each case 51 accommodates two screws or agitators 53 by way of example. There are also shown in FIG. 15 a toner content sensor 54, a toner cartridge 55, a cartridge set sensor 56, a toner receiver 57, a screw 58 for toner replenishment, a toner end sensor 59, a revolver home position sensor 60, a revolver lock 61, a development filter 62, and a pull-out unit 63. The developing unit including the revolver 50 and the drum unit are mounted on the pull-out unit 63 for facilitating maintenance.

FIG. 16 shows the revolver type developing mechanism. As shown, the revolver 50 is rotated by 90 degrees at a time in a direction indicated by an arrow (counterclockwise), so that toner images are sequentially developed in Bk, Y, C and M in this order. The developing unit is received in the pull-out unit 63 such that each case 51 can be easily pulled out independently of the other cases 51.

Figure 17:
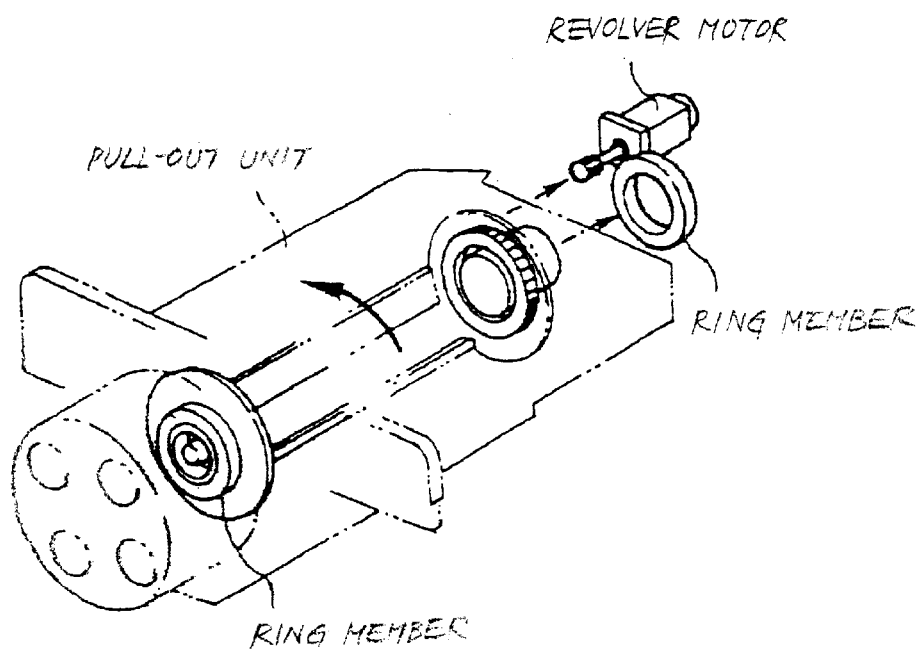
FIG. 17 is a perspective view showing a revolver drive mechanism included in the developing unit.

FIG. 17 shows a driveline for driving the revolver 50. As shown, the revolver is rotatable about the center of a pair of ring members mounted on opposite side walls of the revolver. A revolver motor causes the revolver to rotate. To surely rotate the revolver by each 90 degrees, use is made of a system that switches exciting current. The revolver motor is implemented by a two phase, PM type stepping motor.

Figure 18:
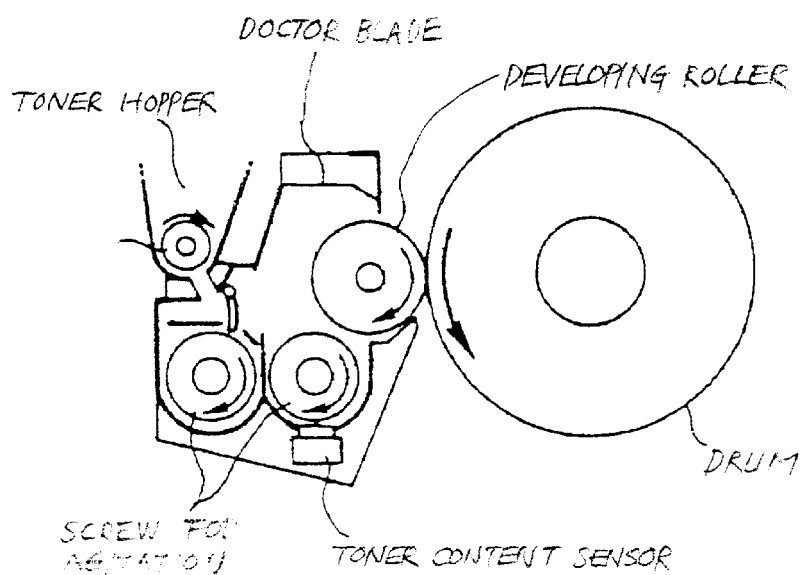
FIG. 18 is a section showing one of cases included in the revolver.

FIG. 18 shows each case of the revolver in detail. As shown, the two screws deliver the developer (700 g) stored in the case to a developing roller. The developer deposits on the developing roller due to the force of a magnet accommodated in the developing roller. The developing roller conveys the developer to a developing position where the developing roller and a photoconductive drum face each other. At this instant, a doctor blade or metering member regulates the height of the developer. At the developing position, the developing roller and drum move in the same direction as each other. A gap between the developing roller and the drum is guaranteed by the combination of developing unit fixing portions arranged at opposite ends of the case and the revolver.

Figure 19:
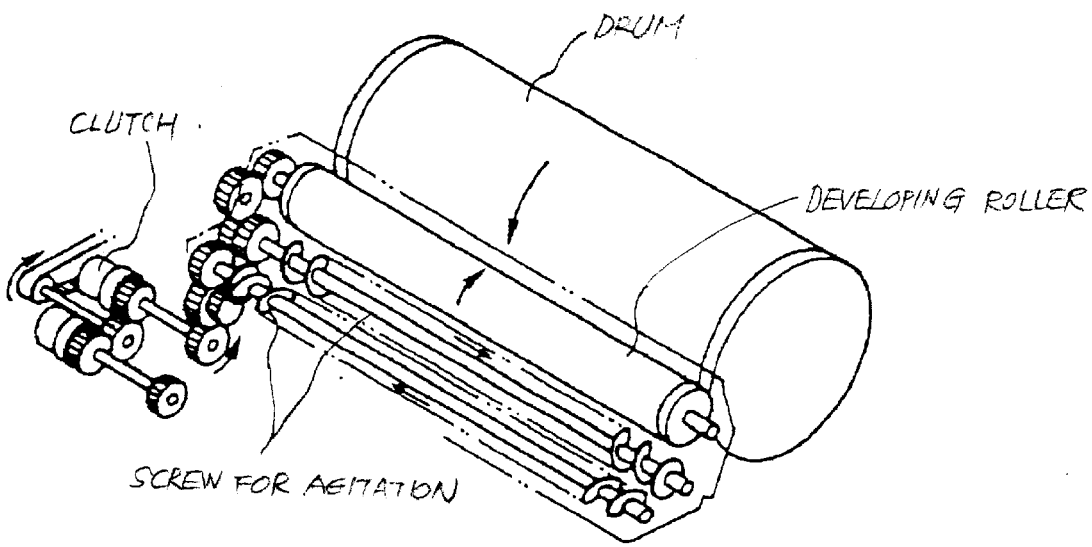
FIG. 19 is a perspective view showing a drive mechanism for development included in the developing unit.

FIG. 19 shows a drive mechanism for development. As shown, the drive mechanism drives only the case of the revolver that is located at the developing position. Specifically, a motor adjoining the drum rotates the developing roller and screws via a clutch and idler gears.

Figure 20:
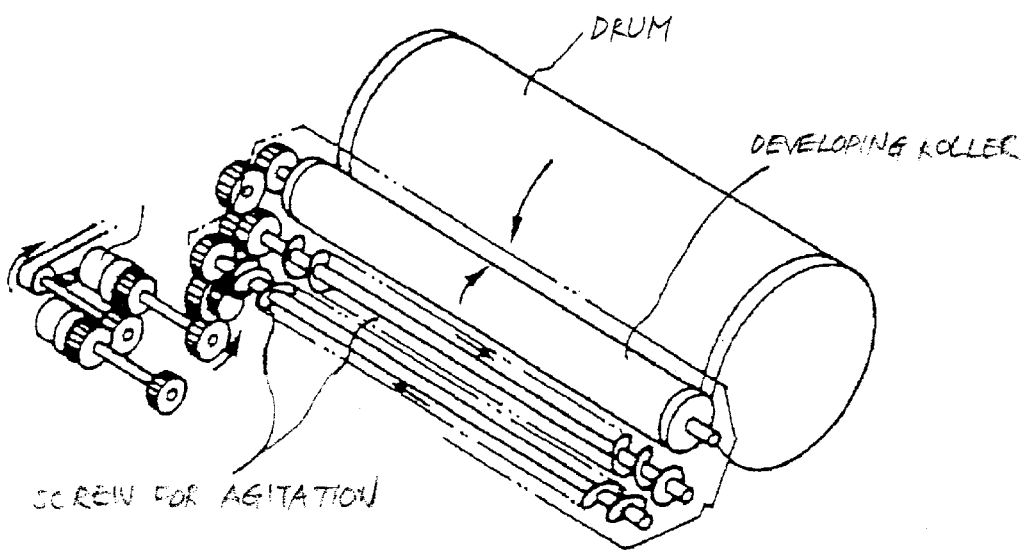
FIG. 20 is a perspective view showing a mechanism for agitation included in the developing unit.

FIG. 20 shows a drive arrangement for the agitation of the developer. As shown, two screws are rotated via the clutch and idler gears in order to circulate the developer in the case in the front-and-rear direction while agitating it.

The number of magnets constituting the main pole, the number of screws for agitation and so forth shown and described are only illustrative and not restrictive. Also, the present invention is applicable not only to a full-color image forming apparatus but also to an image forming apparatus using a single color or any other suitable number of colors. The revolver may be replaced with, e.g., a developing system having a plurality of developing units arranged around an image carrier or a plurality of slidable developing units. The copier is, of course, representative of a family of image forming apparatuses including a printer and a facsimile apparatus.

In summary, it will be seen that the present invention provides a developing device for an image forming apparatus having various unprecedented advantages, as enumerated below.

(1) A developer carrier has a main magnetic pole and an auxiliary magnetic pole adjoining the main pole and helping the main pole exert a magnetic force. This, coupled with the fact that a gap between the developer carrier and an image carrier is 0.3 mm or above, but 0.6 mm or below, reduces the edge effect and realizes high image quality with desirable tonality.

(2) The carrier packing ratio of a developer, as measured at a developing region, is 10% or above, but 50% or below. An image is therefore free from a brush mark and granularity. In addition, the adhesion of the developer is obviated, so that a load acting on the image carrier varies little.

(3) The above advantages (1) and (2) are further enhanced when the gap between the developer carrier and the image carrier is 0.35 mm or above, but 0.5 mm or below, and when the carrier packing density is 15% or above, but 45% or below.

(4) The image forming apparatus with the above developing device insures high image quality and causes a load acting thereon to vary little.

Various modifications will become possible for those skilled in the art after receiving the teachings of the present disclosure without departing from the scope thereof.

What is claimed is:

1. A developing device for use with an image carrier for carrying a latent image thereon, comprising:

a developer carrier in a form of a magnet brush configured to deposit a developer on the image carrier, wherein said magnet brush is caused to contact the latent image to thereby develop said latent image;

said developer carrier comprising a main magnetic pole for development and an auxiliary magnetic pole adjoining said main magnetic pole and helping said main magnetic pole exert a magnetic force;

said developer carrier and said image carrier being spaced by a gap of 0.35 mm or above, but 0.5 mm or below;

the developer carrier having a carrier packing ratio of 15% or above, but 45% or below, as measured at a developing region.

2. In an image forming apparatus comprising an image carrier for carrying a latent image thereon and a developing device including a developer carrier in a form of a magnet brush configured to deposit a developer on the image carrier, wherein said magnet brush is caused to contact said latent image to thereby develop said latent image, said developer carrier comprises a main magnetic pole for development and an auxiliary magnetic pole adjoining said main magnetic pole and helping said main magnetic pole exert a magnetic force, said developer carrier and said image carrier are spaced by a gap of 0.35 mm or above, but 0.5 mm or below, and the developer carrier has a carrier packing ratio of 15% or above, but 45% or below, as measured at a developing region.

3. A developing device for use with an image carrier for carrying a latent image thereon, comprising:

a developer carrier in a form of a magnet brush configured to deposit a developer on the image carrier, wherein said magnet brush is caused to contact the latent image to thereby develop said latent image;

said developer carrier comprising a main magnetic pole for development and an auxiliary magnetic pole adjoining said main magnetic pole and helping said main magnetic pole exert a magnetic force;

said developer carrier having a carrier packing ratio or 10% or above, but 50% or below, as measured at a developing region.

4. The developing device as claimed in claim 3, wherein the carrier packing ratio of the developer carrier is 15% or above, but 45% or below, as measured at the developing region.

5. In an image forming apparatus comprising an image carrier for carrying a latent image thereon and a developing device including a developer carrier in a form of a magnet brush configured to deposit a developer on the image carrier, wherein said magnet bush is caused to contact said latent image to thereby develop said latent image, said developer carrier comprises a main magnetic pole for development an auxiliary magnetic pole adjoining said main magnetic pole and helping said main magnetic pole exert a magnetic force, and said developer carrier having a carrier packing ratio of 10% or above, but 50% or below, as measured at a developing region.

6. The apparatus as claimed in claim 5, wherein the carrier packing ratio of the developer carrier is 15% or above, but 45% or below, as measured at the developing region.

* * * * *